United States Patent [19]

Klingler

[11] Patent Number: 4,790,557
[45] Date of Patent: Dec. 13, 1988

[54] THREE-POINT HITCH STABILIZER

[76] Inventor: Kenneth J. Klingler, Rte. #1 - Box 186A, New Ulm, Minn. 56073

[21] Appl. No.: 67,253

[22] Filed: Jun. 29, 1987

[51] Int. Cl.⁴ ............................................. B62D 1/00
[52] U.S. Cl. .................................. 280/460 A; 172/450
[58] Field of Search .......... 280/460 A, 446 R, 446 A, 280/446 B, 461 A, 456 A, 479 A, 490 A, 474; 172/450

[56] References Cited

U.S. PATENT DOCUMENTS 2,673,506 3/1954 Miller et al. ................. 280/456 A X
4,470,613 9/1984 Sykes ............................... 280/474 X

FOREIGN PATENT DOCUMENTS 2936404 3/1981 Fed. Rep. of Germany ... 280/460 A

*Primary Examiner*—John J. Love
*Assistant Examiner*—Mitchell J. Hill
*Attorney, Agent, or Firm*—Douglas L. Tschida

[57] ABSTRACT

Free-play restraining apparatus for a three-point implement hitch, comprising a pair of adjustable, slideway-acting planar uprights mounted to the implement frame adjacent the hitch arms. Length adjustable fore and aft stops mounted to contact each clamp plate and multiple length adjustable stops mounted to each upright and contacting the vehicle frame, along with lubrication fittings opening to the slideway surface, provide a lubricated coplanar slidway restraint.

6 Claims, 2 Drawing Sheets

THREE-POINT HITCH STABILIZER

BACKGROUND OF THE INVENTION

The present invention relates to three-point implement hitches for farm tractors and, in particular, to apparatus for stabilizing conventional, three-point turnbuckle coupled hitch arms against side-to-side sway.

One problem, among the many, which has long plagued the farm operator, is that of implement sway which occurs with the use of three-point hydraulic hitches included on most farm tractors. This problem is particularly acute for a variety of models of International Harvester TM tractors wherein the right and left lower hydraulic lift arms have a pronounced sway at their implement attaching ends, due to the use of pinned turnbuckles to couple each arm to the tractor.

While a flexible connection is desired, inordinate sway affects all phases of the farm operation and creates undue stress upon the linkage, especially when towing heavy implements. It also requires greater amounts of operator attention, which could better be turned towards the host of other details an operator must concentrate on when operating any implement, be it a seeder or fertilizer spreader with their rather costly loads. Trailering between fields on the roadways is also a problem and caution must again be exerted due to the hazard presented to the frustrated motorist who too is concerned with implement sway when passing.

It is with the above concerns in mind that the present invention was developed and which mounts with relatively little modification to most available tractor frames. It finds particular advantage with International Harvester TM tractors and may be adjustably positioned relative to the hydraulic lift arms to control their side-to-side movement.

SUMMARY OF THE INVENTION

It is accordingly a primary object of the present invention to provide apparatus for minimizing the side-to-side sway of conventional three-point implement hitches found on most farm tractors.

It is a further object of the invention to provide an assembly including adjustably positioned slide members mounting between the tractor frame and hitch members.

It is a still further object of the invention to include lubrication means whereby undue wear is not perpetuated between the hitch arms and stabilizer mechanism.

The foregoing objects and advantages of the invention are particularly achieved in the presently preferred embodiment wherein right and left mounting plates are provided for attachment to the frame of a farm tractor. Upright members clamp coupled to each mounting plate include fore and aft threaded stop members to adjustably secure each upright in coplanar relation to the right and left lift arms. Length adjustable stops secured to the upright plates constrain the upper end of each upright and together the upper and lower stops prevent against changes in the angular orientation of the uprights once established. Zerk fittings mounted in through bores in the uprights permit the lubrication of the slideway between the mating outer upright surface and the inner surface of each lift arm.

The above objects, advantages and distinctions of the invention, along with others, as well as the detailed construction of the invention, will be described hereinafter with respect to the appended drawings. Before referring thereto, it is to be appreciated the following description is made by way of the presently preferred embodiment only and is not intended to be all-inclusive in its detail. To the extent, however, modifications or enhancements may have been contemplated, they are described as appropriate.

DESCRIPTION OF THE PREFERRED EMBODIMENT

Figure 1:
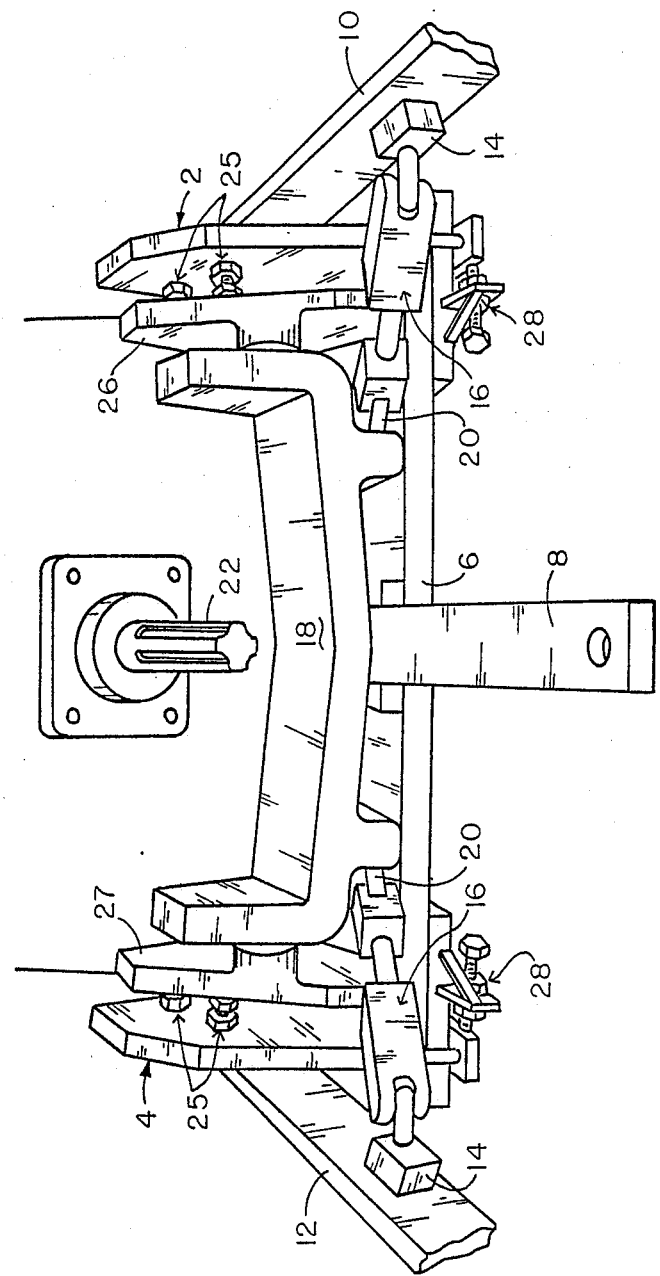
FIG. 1 shows a detailed assembly view of the invention in relation to a typical three-point implement hitch and PTO of a conventional farm tractor.

Turning attention to FIG. 1, an assembly view is shown of the present invention in mounted relation to a typical, although fore-shortened, three-point implement hitch as it extends from the rear of a farm tractor.

While the actual construction of the three-point hitch assembly may vary, depending upon tractor manufacturer and/or model type, each generally includes a pair of hydraulically controlled lift arms 10 and 12 which are flexibly supported in relation to the tractor frame. A mating power input shaft (not shown) from the implement, in turn, couples to the PTO output shaft 22.

As a class, such hitches tend to exhibit the aforementioned sway, some having more and some having less, depending upon the lift arm coupling assembly. In almost all cases, though, the sway creates problems for the farm operator, as previously mentioned, but which may be removed with the judicious use of a stabilizer of the present type. That is, a mechanism including upright slide surfaces adjustably positioned relative to the lift arms to restrict their side-to-side movement.

Specifically, right and left stabilizer members 2 and 4 are mounted to the outer ends of a lower horizontal tractor frame member 6, from which a draw bar 8 extends, and between the right and left lift or hitch arms 10 and 12 which may be hydraulically raised and lowered under operator control. Extending from a pivot block member 14 mounted to an inner surface of each hitch arm is a pinned, length adjustable turnbuckle member 16 which is similarly coupled at its opposite end to a yoke frame member 18 having right and left side pivots 20. Shown above the yoke member 18 is PTO output shaft 22 which may be coupled to a drawn implement, as necessary, to supply power thereto. It is the side-to-side movement of the hitch arms 10 and 12, which the turnbuckles 16 permit, that the invention seeks to control.

As mounted, each of the right and left stabilizers 2 and 4 are adjustably positioned to lie in coplanar parallel relation to each of the hitch arms 10 and 12, such that the hitch arms restrainably slide along the outer surface of each stabilizer as they are raised and lowered. A suitable grease is injected into the slide area to provide smooth operation without undue wear over time to the stabilizers and hitch arms. A selected stabilizer position is maintained via a plurality of adjustable stud members 25 which extend from and along the inner surfaces of each stabilizer to contact the tractor frame members 26 and 27 which support the yoke member 18. Similarly, adjustable stops 28 (see FIG. 2) are secured fore and aft of the bottom of each stabilizer 2 and 4 along each mounting plate 30 to maintain an adjusted angular orientation. Although only the aft stops are shown in FIG. 1, it is to be appreciated forward stops of a similar construction are also provided on the forward edge of each mounting plate 30.

Figure 2:
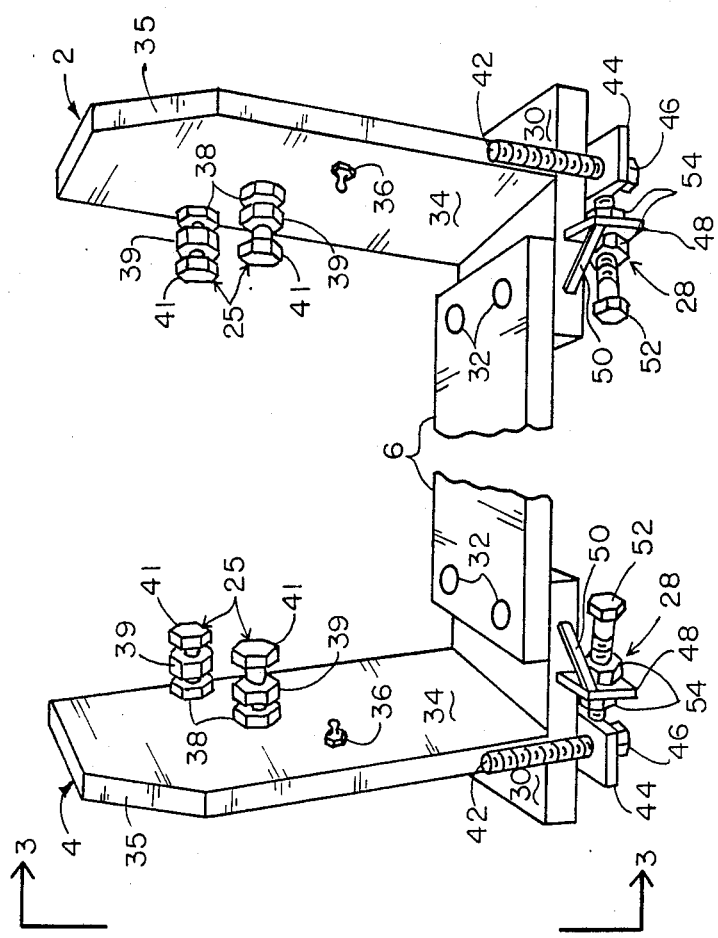
FIG. 2 shows a detailed perspective view of each upright member and its associated mounting plate.

Referring next to FIG. 2, a detailed perspective view is shown of the right and left stabilizers 2 and 4, independent of the implement hitch. From this view, it can better be appreciated that each stabilizer includes a lower horizontal mounting plate 30 wherein a number of mounting holes are provided to align with the holes 32 bored in the tractor frame member 6.

Extending upwardly from each mounting plate 30 is an upright, generally rectangular, upright planar member 34, one corner 35 of which is cut off at an angle sufficient to provide clearance relative to the pivot blocks 14, as the right and left lift arms 10 and 12 are raised and lowered. Projecting outwardly from the inner surface of each upright planar member 34 are a pair of upper stop members 25 and individual lubricant fittings 36. Each fitting 36 is mounted to a tapped through hole (not shown), such that a suitable lubricant or grease may be injected into the space between the outer upright surface and the inner lift arm surface to create a lubricated slideway While single so-called "zerk" fittings 36 are shown, it is to be appreciated that multiple fittings may be employed, just as the zerk fitting 36 might mount to a manifold member which, in turn, distributes the lubricant to a number of outlet ports provided along the slideway surface.

Mounted near the upper end of each, right and left stabilizers 2 and 4 are the mentioned adjustable stops 25 which, in the presently preferred embodiment, are comprised of threaded bolt members 41 which are mounted to each upright via a nut member 38 welded to the inner upright surface. An intermediate nut 39 acts as a lock nut to maintain a desired spacing of the head of bolt 41 relative to the inner stabilizer surface. In the disclosed embodiment and when used with International Harvester TM tractors, two stops 25 are normally required, although it is to be appreciated that for other tractors and model types, other stops 25 may similarly be mounted to the uprights relative to the adjoining tractor frame Thus, upon mounting each stabilizer 2 and 4 to the tractor and aligning each upright planar member 34 with the lift arms 10 and 12 in their fully raised positions, the displacement of the stops 25 is adjusted until the bolt heads contact and induce a desired separation of the hitch arms from the adjoining frame.

Welded in spaced apart relation from the outer side edges of each upright planar member 34 are a pair of downwardly extending threaded rod members 42 which pass through mating holes in right and left lower clamp plate 44, secured beneath each mounting plates 30. Because the spacing between each upright's rod members 42 is slightly greater than that of the mounting plate 30, due to the spacing of the rod members 42 away from the upright planar member edges, the angular orientation of each upright planar member 34 may be adjusted to bring each upright planar member coplanar relation with its adjacent hitch arm 10 or 12. Upon establishing this position, the clamp plate 44 may be drawn against the mounting plate 30 by tightening the nuts 46 mounted to the rods 42. During initial setup, most commonly each upright planar member is rough positioned and partially tightened, the final position is established only after adjusting the displacement of the adjacent lower stop members 28 secured to the sides of the mounting plate 30 and upper stop members 25.

Specifically, each stop member 28 is comprised of a bored weldment 48 secured to the mounting plate 30 and braced via a bracing weldment 50. A threaded bolt 52 is mounted through the weldment 48, with nuts 54 secured on each side of the weldment 48 Upon loosening the nuts 54, the bolt 52 may be extended a desired distance relative to the ends of the clamp plate 44 to finally position the upright planar member 34. At that point, the nuts are drawn tight against the weldment 48 and act in a lock nut arrangement. In combination therefore, the upper stops 25 and the lower stops 28 establish each upright planar member's mounting position relative to the lift arms 10 and 12 and prevent any undesired side-to-side movement. It is also to be appreciated that each upright's position may be slightly adjusted in the field by appropriately loosening the lock nuts 39 and 54 and adjusting the bolts 41 and 52, as necessary, to accommodate a specific implement hitch spacing.

Depending too upon the category of hitch connection desired (i.e. category 11 or category III), the length of the bolts used with the stop members 25 and 28 may be varied to provide the necessary spacing between the stabilizers 2 and 4. That is, a spacing of 34 inches provides for a category II hitch and a spacing of 38 inches provides for a category III hitch.

Figure 3:
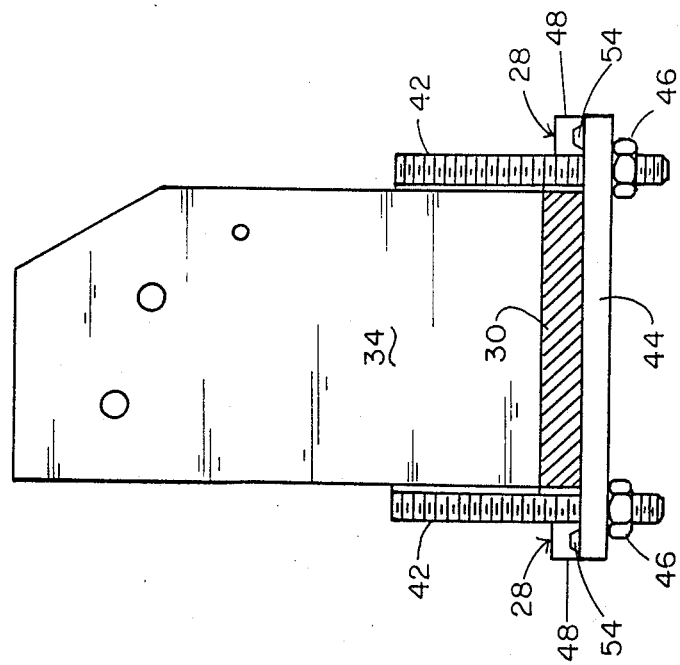
FIG. 3 shows a side elevation view taken along reference lines 3—3 of the left upright member and the details of its clamp mounting to its associated mounting plate.

Attention is lastly directed to FIG. 3, wherein a side elevation view is shown of the left upright planar member 34 in its clamped mounting relation to its mounting iron 30, less its fore and aft stop members 28. From this view, a better appreciation can be had of the mounting relation of the threaded rod members 42 to the upright plan or member 34 and the clamp action between the mounting plate 30 and the clamp plate 44. While welded threaded rods 42 are presently used, it is to be appreciated that, alternatively, slots may be formed in the mounting iron 30 and wherethrough bolts secured in threaded holes in the bottom of the upright planar member 34 may extend. Alternatively, other locking arrangements in lieu of a clamp arrangement, may be employed to secure the upright planar members 34, with or without the aid of associated stops 25 and 28. However, it is believed that the present clamped, stopped assembly offers advantages of construction and, over time, effectively minimizes against mis-alignment induced by vibration, etc.

While the present invention has been described with respect to its presently preferred embodiment and various modifications thereto, it is to be appreciated that still other arrangements might suggest themselves to those of skill in the art, without departing from the spirit and scope hereof. Accordingly, it is contemplated that the following claims should be interpreted so as to include all those equivalent embodiments within the spirit and scope thereof.

What is claimed is:

1. Apparatus for stabilizing a vehicle-mounted implement hitch having a pair of hitch arms capable of being raised and lowered and each exhibiting side-to-side sway comprising:
   (a) first and second upright planar members, vertically supported from a bottom edge and having a pair of vertically disposed threaded weldments extending downward on opposite sides of respective first and second laterally extending, horizontal mounting plates rigidly secured to the vehicle frame and wherein the spacing between the pairs of threaded weldments is greater than the width of said first and second mounting plates to permit the horizontal rotation of each planar member;

(b) first and second clamp plates respectively receiving the pairs of threaded weldments of said first and second planar members and means mounting to said threaded weldments for compressively drawing each upright planar member and clamp plate to its mounting plate; and (c) length adjustable stop means for adjustably supporting an upper and a lower end of each upright planar member relative to the vehicle and its associated mounting plate to bring each upright planar member into planar parallel relation to each hitch arm at an outer sway extreme whereby each hitch arm slidably contacts one of said upright planar members as it is raised and lowered.

2. Apparatus as set forth in claim 1 wherein said stop means comprises:

(a) a plurality of threaded members separately extensible from an upper surface of each upright planar member to contact the vehicle frame; and (b) a plurality of threaded members separately extensible from fore and aft weldments secured to each of said mounting plates to contact and restrain the lower end of each upright planar member.

3. Apparatus as set forth in claim 1 including lubrication means secured to each upright planar member for lubricating the region of contact between each upright planar member and each hitch arm.

4. Apparatus as set forth in claim 3 wherein said lubrication means comprises at least one grease fitting secured to an aperture in each upright planar member and in communication with the surface slidably contacting one of said hitch arms.

5. Apparatus for stabilizing an implement hitch including at least one hitch restrained at one end to a supporting vehicle and wherein said arm is capable of being raised and lowered and exhibits inherent side-to-side sway comprising:

(a) at least one upright planar member having a bottom edge supported on a laterally extending mounting plate rigidly secured to the vehicle frame and a vertical surface in contact with said hitch arm;

(b) means for compressively coupling said upright planar member to said mounting plate such that said vertical surface may horizontally rotated into planar parallel relation to the contacting surface of said hitch arm; and (c) at least one length adjustable stop means extending between said upright planar member and the vehicle frame for restraining movement of said upright planar member once positioned relative to said hitch arm.

6. Apparatus as set forth in claim 5 including a second length adjustable stop means secured to and extending between said mounting plate and a clamp plate secured beneath said mounting plate and to said upright planar member for restraining lateral movement of the lower end of said upright planar member.

* * * * *